United States Patent [19]

Alfanta

[11] 4,279,343
[45] Jul. 21, 1981

[54] REPAIR KIT FOR TUBELESS TIRES

[76] Inventor: Teofilo Alfanta, 12961 Brown Ave., San Jose, Calif. 95111

[21] Appl. No.: 115,761

[22] Filed: Jan. 25, 1980

[51] Int. Cl.³ .................... B60C 21/06; B65D 77/02
[52] U.S. Cl. ................................. 206/582; 411/258; 152/370
[58] Field of Search .............. 206/582, 231, 302; 152/370; 81/15.5, 15.6, 15.7; 411/23, 258; 52/98, 704; D8/31

[56] References Cited

U.S. PATENT DOCUMENTS

| | | | |
|---|---|---|---|
| 616,572 | 12/1898 | Herrick | 81/15.6 |
| 2,092,341 | 9/1937 | De Vries | 52/704 |
| 2,901,099 | 8/1959 | Kreible | 206/219 |
| 3,472,301 | 10/1969 | Rearce | 411/258 |
| 4,096,901 | 6/1978 | Reichenbach | 152/370 |
| 4,143,767 | 3/1979 | MacDonald | 206/582 |

FOREIGN PATENT DOCUMENTS

| | | | |
|---|---|---|---|
| 2321115 | 11/1974 | Fed. Rep. of Germany | 206/231 |
| 1174665 | 11/1958 | France | 152/370 |
| 23738 | of 1911 | United Kingdom | 206/302 |

*Primary Examiner*—Herbert F. Ross

[57] ABSTRACT

A kit for repairing puncture holes in a tubeless tire; the kit including an assortment of different diameter sized plugs, contained in a box, for selection of a plug matching a puncture hole size, each plug including a hollow screw of resilient rubber, so that, while being screwed into the puncture hole, a liquid rubber is wrung out therefrom, through side holes in the screw, in order to form an air-tight bond between the screw and the puncture hole.

3 Claims, 5 Drawing Figures

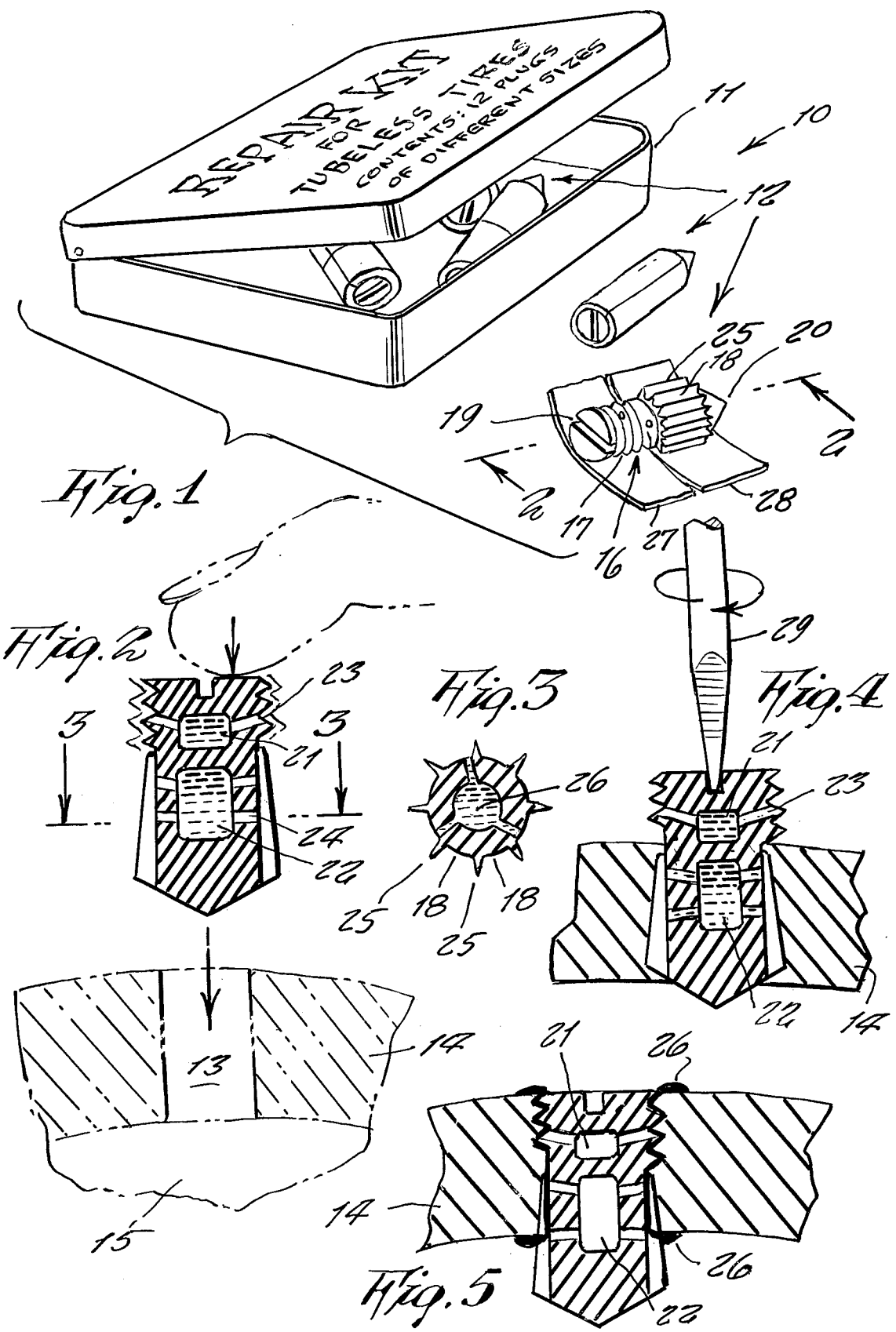

REPAIR KIT FOR TUBELESS TIRES

This invention relates generally to tire repair kits for automotive vehicles.

It is well known, that practically all automotive tires today are of tubeless type, and which, in case of a flat tire, cannot be readily repaired by a motorist himself, while on the road, except if the air leak is tiny, and can be sealed by a liquid sealant poured through the air valve.

Accordingly, it is a principal object of the present invention to provide a repair kit for repairing different sizes of puncture holes through a tubeless tire.

Another object is to provide a repair kit, which is quick to use, requiring only a screw driver for insertion into the puncture hole.

Other objects are to provide a repair kit for tubeless tires, which is simple in design, inexpensive to manufacture, rugged in construction, easy to use, and efficient in operation.

These, and other objects, will be readily evident, upon a study of the following specification, and the accompanying drawing, wherein:

FIG. 1 is a perspective view of the kit, shown with a selection of plugs, one of which is illustrated unwrapped from its cellophane cover paper, that serves to prevent the liquid rubber from being contacted by air, and dried up, prior to use;

FIG. 2 is a cross-sectional view on line 2—2 of FIG. 1, and showing the plug positioned so as to be pushed into a hole in a tubeless tire;

FIG. 3 is a cross-sectional view on line 3—3 of FIG. 2;

FIG. 4 is a view similar to FIG. 2, and showing the plug pushed about three-quarter distance into the hole, at which position the user can start to screw the plug in by a screw driver; the plug being made of a resilient rubber, so that the axial fins, shown in FIG. 3, cause the screwdriver torque to twist and wring out the plut central chambers containing the liquid rubber, and FIG. 5 shows the plug screwed fully into the tire, and the squeezed-out liquid rubber lining the hole interior and opposite ends.

Referring now to the drawing in greater detail, the reference numeral 10 represents a repair kit for tubeless tires, according to the present invention, wherein there is a case 11 containing an assortment of plugs 12, of various different diameter size, so as to be selectively picked out, for fitting any particular size of hole 13 punctured through a wall 14 of a tubeless tire 15. Instructions for use of the plugs to repair the hole may be imprinted on the case outer side, or else on an inner side of the case cover. Alternately, an instructions sheet may be enclosed.

Each plug includes a screw 16, molded of a resilient rubber, having a resilience that is approximately equivalent to that of the tire itself.

The screw includes a screw thread 17, at one end, and a series of longitudinal flutes 18, at its other end. A screw driver slot 19 extends across the end adjacent the screw thread, while an opposite end is tapered to a point 20.

The screw is molded with two central chambers 21 and 22, a first of which communicates, by sideward openings 23, with the screw thread, and the second of which communicates, by sideward openings 24, with the flutes.

Tapered teeth 25 are formed between the flutes, the teeth being outwardly widened in depth at their end which borders the point 20.

A liquid rubber compound 26 fills the chambers and their sideward openings; the compound having the characteristic of drying into a resilient solid, once it is exposed to the air.

A paper cover 27 and 28 is wrapped around each end portion of the screw, so as to prevent air reaching the openings 23 and 24, and drying out the compound therein, prior to use of the plug for repairing a tire; one cover tightly fitting the screw thread, and the other tightly fitting around the teeth, and in the flutes.

In use, the paper covers are first peeled off. The screw is then pushed axially into the tire hole, as shown in FIG. 2; being inserted a full depth of the teeth 25, as shown in FIG. 4. A screw driver 29 is inserted in the slot 19, and the screw is thus turned, while being pushed into the tire, so that the screw thread 17 engages the hole 13. This rotational force, applied to one end of the screw, and the rotational prevention of the screw at its other end, by means of the teeth 25, causes a twisting torque, and wringing action of the screw, so as to squeeze the compound out of the chambers, and into the hole area between the surface of the hole 13 and the screw, the compound coating the entire length of the hole 13, as well as its opposite ends, where contact with air quickly dries it into a resilient solid, as shown in FIG. 5, when the screw is screwed fully in the tire flush with its outer side.

While various changes may be made in the detail construction, it is understood that such changes will be within the spirit and scope of the present invention, as is defined by the appended claims.

What I now claim is:

1. A repair kit for tubeless tires comprising, in combination, a case containing an assortment of different diameter plugs, so as to fit different sizes of puncture holes in a tubeless tire, each said plug comprising a screw of resilient material, a quantity of liquid rubber compound inside said screw, openings on said screw for discharge of said compound, and paper covers around said screw closing said openings.

2. The combination as set forth in claim 1, wherein means at opposite ends of said screw provide torsion for wringing said screw.

3. The combination as set forth in claim 2, wherein said compound has the characteristic of drying to a resilient solid upon exposure to air.

* * * * *